United States Patent Office 2,908,729
Patented Oct. 13, 1959

2,908,729

PROCESS FOR THE PREPARATION OF 1,3,5-TRI-t-BUTYLBENZENE BY ALKYLATION

David A. McCaulay, Chicago, Ill., assignor to Standard Oil Company, Chicago, Ill., a corporation of Indiana No Drawing. Application September 7, 1956
Serial No. 608,421

2 Claims. (Cl. 260—671)

This invention relates to the preparation of 1,3,5-tri-t-butylbenzene by olefin alkylation.

1,3,5-tri-t-butylbenzene has been prepared in the past by alkylating benzene with t-butylchloride and by disproportionating t-butylbenzene with HF and $BF_3$ catalyst. Up to this time, no one has prepared 1,3,5-tri-t-butylbenzene by the most direct route, namely alkylation of benzene or t-butylbenzene with isobutene.

1,3,5-tri-t-butylbenzene is prepared in the process of this invention by alkylating benzene with isobutene in the presence of a liquid HF catalyst. The alkylation reaction is carried out at a temperature between about —20° C. and +40° C. In addition to t-butylbenzene, and di-t-butylbenzene, the hydrocarbon product contains 1,3,5-tri-t-butylbenzene as essentially the only tri-t-butylbenzene produced.

Liquid hydrogen fluoride or hydrofluoric acid containing not more than about 2 or 3 weight percent of water is the catalyst utilized in the process herein. Commercial grade anhydrous hydrofluoric acid is particularly suitable for use in the process. The entire process is carried out under substantially anhydrous conditions in order to maintain the low water content of the catalyst. If necessary, benzene reactant and the isobutene are dehydrated prior to reaction in order to maintain the substantially anhydrous condition in the reaction zone.

The alkylation reaction is a liquid phase one with respect to the benzene reactant and the catalyst. Therefore, sufficient pressure is maintained on the reaction zone to keep the HF catalyst liquid therein.

The benzene reactant charged to the alkylation zone is benzene. The benzene reactant is substantially pure except for the normal impurities such as sulfur compounds and close boiling paraffins found in commercial materials.

The alkylation olefin is isobutene; this is preferably utilized as essentially pure olefin. However, a mixture of isobutene and butanes may also be used.

The alkylation reaction is carried out at a temperature between about —20° C. and +40° C. In order to maximize the yield of the desired 1,3,5-tri-t-butylbenzene, sufficient time must be given to permit isomerization of the p-di-t-butylbenzene formed, as it is believed to be one step in the process to the meta isomer which is alkylatable to the 1,3,5-tri-t-butylbenzene. In general, it is desired to carry out the contacting in the alkylation zone for a time between about 15 minutes and 8 hours, the longer times corresponding to the lower temperatures. It is not necessary to operate for the maximum time at any temperature if maximum yield is not an object of the particular reaction.

The liquid HF catalyst is present in the contacting zone in an amount between about 50 and 500 volume percent, based on the benzene reactant charged thereto.

In general, sufficient isobutene is charged to the alkylation zone to theoretically convert all of the benzene reactant to the tri-t-butylbenzene product. Less than this amount may be charged when maximum yields are not an object of the process. It appears that regardless of the amount of isobutene charged, isobutene will be lost to polymerization reactions and also the t-butylbenzene and di-t-butylbenzenes will not be completely converted. Thus higher yields of the 1,3,5-tri-t-butylbenzene are obtainable by using more than the theoretical amount of isobutene even though the use of much more than this amount is not economical.

The isobutene is polymerized rather readily under the conditions of the process and the alkylation reaction is favored by introducing the isobutene into the alkylation zone in small amounts continuously at a substantially uniform rate over the total reaction time. For example, if the process is being carried out at a temperature of 25° C. for a time of about 4 hours, the isobutene is added to the alkylation zone at such a rate that at the end of the 4 hours contacting time all of the isobutene will have been added to the alkylation zone. Little or no additional contacting is necessary subsequent to the final addition of isobutene.

At the end of the contacting time, the contents of the reaction zone may be separated by simple gravity settling into a hydrocarbon phase and an HF-catalyst phase. The HF-catalyst phase may be recycled to the alkylation zone. Or, the HF-catalyst may be distilled away from the hydrocarbon product.

The hydrocarbon product mixture comprises unreacted benzene reactant, t-butylbenzene, di-t-butylbenzenes, 1,3,5-tri-t-butylbenzene and higher boiling materials, probably isobutene polymers. Within the error of infrared spectrometry, the tri-t-butylbenzene material consists of the 1,3,5-tri-t-butylbenzene only.

The results obtainable with the process of the invention are illustrated by the following examples. All of the examples are carried out in a Hastelloy autoclave provided with a propeller stirrer. Commercial grade hydrofluoric acid and nitration grade benzene were charged to the autoclave and the mixture brought to the desired alkylation temperature. Essentially pure isobutene was added to the autoclave at a uniform rate over the total contacting time utilizing a pump to introduce the isobutene. At the completion of the reaction time, the total contents of the autoclave were transmitted to a polyethylene flask containing cold water. The hydrocarbon layer was decanted from the lower aqueous layer. After neutralization, the hydrocarbons were separated into close boiling fractions on an efficient laboratory column. The fractions were analyzed by physical properties and infrared spectrometry. The results of these tests are set out in the annexed table.

Table

| Example | A | B |
|---|---|---|
| Benzene, moles | 0.86 | 0.75 |
| Isobutene/B.R. mole ratio | 3.0 | 3.1 |
| HF, Vol. percent on B.R. | 400 | 320 |
| Temperature, °C. | 32 | 19 |
| Isobutene Addition Time, Minutes | 130 | 240 |
| Hydrocarbon Product Distribution, Mole Percent: | | |
| Benzene | 5 | 8 |
| $C_8$-$C_{12}$ Paraffins | 5 | 2 |
| t-butylbenzene | 3 | 2 |
| m-di-t-butylbenzene | 14 | 14 |
| p-di-t-butylbenzene | 18 | 17 |
| 1,3,5-tri-t-butylbenzene | 15 | 19 |
| Higher boiling | 45 | 40 |

All of the examples show that even by introducing the isobutene at the low rate of 1 ml. per minute in Example B, a large percentage of the isobutene went to produce high boiling polymers. The data of Examples A and B show that at the higher temperatures or longer times at moderate temperatures the para-di-t-butylbenzene is isomerized to meta-di-t-butylbenzene. Example B indicates that maximum yield is obtainable by operating at about ordinary room temperature utilizing about a 4 hour contacting time in order to isomerize the para-di-t-butylbenzene to the meta isomer which is alkylatable to the 1,3,5-tri-t-butylbenzene. These examples show that operating under the defined conditions of the instant invention, good yields of 1,3,5-tri-t-butylbenzene are obtainable by direct alkylation of benzene with isobutene.

The 1,3,5-tri-t-butylbenzene is useful as an intermediate wherein symmetrical alkylbenzene is needed. Another use for this material is as a high octane component boiling in the heavy end of gasolines.

Thus having described the invention, what is claimed is:

1. A process for preparing 1,3,5-tri-t-butylbenzene which comprises contacting, under substantially anhydrous conditions, benzene and isobutene in a mol ratio of benzene to isobutene of about 3, in the presence of liquid HF catalyst, in an amount between about 50 and 500 volume percent, based on said benzene reactant, at a temperature between about −20° C. and +40° C. for a time between about 15 minutes and 8 hours, the longer times corresponding to the lower temperatures, recovering from the hydrocarbon product mixture 1,3,5-tri-t-butylbenzene as essentially the only tri-t-butylbenzene product, said isobutene being added to the contacting zone substantially uniformly over the contacting time.

2. The process of claim 1 wherein said temperature is between about 15° and 25° C.

References Cited in the file of this patent

UNITED STATES PATENTS 2,768,985     Schlatter _____ Oct. 30, 1956

OTHER REFERENCES

Bartlett et al.: Jour. Am. Chem. Soc., vol. 76, Dec. 1, 1953, pp. 2349–53.